United States Patent [19]
Sato et al.

[11] Patent Number: 5,640,598
[45] Date of Patent: Jun. 17, 1997

[54] DATA TRANSFER PROCESSING SYSTEM

[75] Inventors: Fumiki Sato; Kouichi Fujita, both of Hyogo-ken, Japan

[73] Assignee: Mitsubishi Denki Kabushiki Kaisha, Tokyo, Japan

[21] Appl. No.: 595,419

[22] Filed: Feb. 5, 1996

Related U.S. Application Data

[63] Continuation of Ser. No. 274,117, Jul. 12, 1994, abandoned.

[51] Int. Cl.$^6$ .............................. G06F 9/06; G06F 13/10
[52] U.S. Cl. ............... 395/842; 395/200.01; 395/200.07; 395/427; 395/821; 395/868; 364/242.3; 364/242.31
[58] Field of Search ....................... 395/427, 821, 395/842, 700, 200.01, 200.07, 868; 364/242.3, 242.31

[56] References Cited

U.S. PATENT DOCUMENTS

| | | | |
|---|---|---|---|
| 4,075,691 | 2/1978 | Davis et al. | 364/200 |
| 4,521,871 | 6/1985 | Galdun et al. | 395/275 |
| 4,811,306 | 3/1989 | Böning et al. | 364/200 |
| 4,821,180 | 4/1989 | Gerety et al. | 364/200 |
| 4,847,750 | 7/1989 | Daniel | 364/200 |
| 4,901,234 | 2/1990 | Heath et al. | 364/200 |
| 4,989,113 | 1/1991 | Hull, Jr. et al. | 364/200 |
| 5,111,425 | 5/1992 | Takeuchi et al. | 395/425 |
| 5,119,487 | 6/1992 | Taniai et al. | 395/425 |
| 5,208,915 | 5/1993 | Stadlmeier et al. | 395/325 |
| 5,212,795 | 5/1993 | Hendry | 395/725 |
| 5,287,486 | 2/1994 | Yamasaki et al. | 395/425 |

*Primary Examiner*—Kevin A. Kriess
*Assistant Examiner*—Michael T. Richey
*Attorney, Agent, or Firm*—Townsend and Towsend and Crew LLP

[57] ABSTRACT

A transfer processing procedure comprising instruction words is inputted from an external to a program storing area of a DMA processing unit 40 whose functions are arranged to correspond to instructions, and the DMA processing unit 40 performs a transfer process in accordance with the function corresponding to the inputted instruction word.

14 Claims, 14 Drawing Sheets

FIG. 2

| INSTRUC-TION WORD | FUNCTION |
|---|---|
| STDMA n | STORING THE SUBSEQUENT n INSTRUCTIONS IN PROGRAM STORING AREA OF DMA PROCESSING UNIT. |
| WAIT | STOPPING PROCESS UNTIL DMA TRANSFER REQUEST SIGNAL IS INPUTTED UNDER INSTRUCTION OF DMA PROCESSING UNIT. |
| LDB AI | WHEN TC=0, WRITING BYTE DATA FROM ADDRESS, INDICATED BY SA0 (TRANSFER-SOURCE TOP ADDRESS REGISTER), IN DR AND SIMULTANEOUSLY WRITING (CONTENT OF SA0) +1 IN SA; WHEN TC IS NOT EQUAL TO 0, WRITING BYTE DATA FROM ADDRESS, INDICATED BY SA, IN DR AND SIMULTANEOUSLY WRITING (CONTENT OF SA) +1 IN SA. |
| LDB AD | WHEN TC=0, WRITING BYTE DATA FROM ADDRESS, INDICATED BY SA0, IN DR AND SIMULTANEOUSLY WRITING (CONTENT OF SA0) -1 IN SA; WHEN TC IS NOT EQUAL TO 0, WRITING BYTE DATA FROM ADDRESS, INDICATED BY SA, IN DR AND SIMULTANEOUSLY WRITING (CONTENT OF SA) -1 IN SA. |
| LDB AU | WHEN TC=0, WRITING BYTE DATA FROM ADDRESS, INDICATED BY SA0, IN DR AND SIMULTANEOUSLY WRITING (CONTENT OF SA0) IN SA; WHEN TC IS NOT EQUAL TO 0, WRITING BYTE DATA FROM ADDRESS, INDICATED BY SA, IN DR AND SIMULTANEOUSLY WRITING (CONTENT OF SA) IN SA. |
| LDW AI | WHEN TC=0, WRITING WORD DATA FROM ADDRESS, INDICATED BY SA0, IN DR AND SIMULTANEOUSLY WRITING (CONTENT OF SA0) +2 IN SA; WHEN TC IS NOT EQUAL TO 0, WRITING WORD DATA FROM ADDRESS, INDICATED BY SA, IN DR AND SIMULTANEOUSLY WRITING (CONTENT OF SA) +2 IN SA. |
| LDW AD | WHEN TC=0, WRITING WORD DATA FROM ADDRESS, INDICATED BY SA0, IN DR AND SIMULTANEOUSLY WRITING (CONTENT OF SA0) -2 IN SA; WHEN TC IS NOT EQUAL TO 0, WRITING WORD DATA FROM ADDRESS, INDICATED BY SA, IN DR AND SIMULTANEOUSLY WRITING (CONTENT OF SA) -2 IN SA. |
| LDW AU | WHEN TC=0, WRITING WORD DATA FROM ADDRESS, INDICATED BY SA0 IN DR AND SIMULTANEOUSLY WRITING (CONTENT OF SA0) IN SA; WHEN TC IS NOT EQUAL TO 0, WRITING WORD DATA FROM ADDRESS, INDICATED BY SA, IN DR AND SIMULTANEOUSLY WRITING (CONTENT OF SA) IN SA. |

FIG. 3

| INSTRUCTION WORD | FUNCTION |
|---|---|
| STB AI | WHEN TC=0, WRITING BYTE DATA OF DR IN ADDRESS INDICATED BY DR∅(TRANSFER-DESTINATION TOP ADDRESS REGISTER) AND SIMULTANEOUSLY WRITING (CONTENT OF DA∅)+1 IN DA; WHEN TC IS NOT EQUAL TO 0, WRITING BYTE DATA OF DR IN ADDRESS INDICATED BY DA AND SIMULTANEOUSLY WRITING (CONTENT OF DA)+1 IN DA |
| STB AD | WHEN TC=0, WRITING BYTE DATA OF DR IN ADDRESS INDICATED BY DA∅ AND SIMULTANEOUSLY WRITING (CONTENT OF DA∅)-1 IN DA; WHEN TC IS NOT EQUAL TO 0, WRITING BYTE DATA OF DR IN ADDRESS INDICATED BY DA AND SIMULTANEOUSLY WRITING (CONTENT OF DA)-1 IN DA |
| STB AU | WHEN TC=0, WRITING BYTE DATA OF DR IN ADDRESS INDICATED BY DA∅ AND SIMULTANEOUSLY WRITING (CONTENT OF DA∅) IN DA; WHEN TC IS NOT EQUAL TO 0, WRITING BYTE DATA OF DR IN ADDRESS INDICATED BY DA AND SIMULTANEOUSLY WRITING (CONTENT OF DA) IN DA |
| STW AI | WHEN TC=0, WRITING WORD DATA OF DR IN ADDRESS INDICATED BY DA∅ AND SIMULTANEOUSLY WRITING (CONTENT OF DA∅)+2 IN DA; WHEN TC IS NOT EQUAL TO 0, WRITING WORD DATA OF DR IN ADDRESS INDICATED BY DA AND SIMULTANEOUSLY WRITING (CONTENT OF DA)+2 IN DA |
| STW AD | WHEN TC=0, WRITING WORD DATA OF DR IN ADDRESS INDICATED BY DA∅ AND SIMULTANEOUSLY WRITING (CONTENT OF DA∅)-2 IN DA; WHEN TC IS NOT EQUAL TO 0, WRITING WORD DATA OF DR IN ADDRESS INDICATED BY DA AND SIMULTANEOUSLY WRITING (CONTENT OF DA)-2 IN DA |
| STW AU | WHEN TC=0, WRITING WORD DATA OF DR IN ADDRESS INDICATED BY DA∅ AND SIMULTANEOUSLY WRITING (CONTENT OF DA∅) IN DA; WHEN TC IS NOT EQUAL TO 0, WRITING WORD DATA OF DR IN ADDRESS INDICATED BY DA AND SIMULTANEOUSLY WRITING (CONTENT OF DA) IN DA |
| LOOP $\ell$,m | WHEN TC=0, WRITING TC∅-1 IN TC; THEREAFTER, IF TC IS NOT EQUAL TO 0, BRANCHING TO LABEL$\ell$, AND IF TC=0, BRANCHING TO LABEL m; WHEN TC IS NOT EQUAL TO 0, WRITING TC-1 IN TC; THEREAFTER TC IS NOT EQUAL TO 0, BRANCHING LABEL $\ell$, AND TC=0, BRANCHING TO LABEL m |

FIG. 4

| INSTRUCTION WORD | FUNCTION |
|---|---|
| MOV SA0, ADR | WRITING TRANSFER-SOURCE TOP ADDRESS ADR IN TRANSFER-SOURCE TOP ADDRESS REGISTER. |
| MOV DA0, ADR | WRITING TRANSFER-DESTINATION TOP ADDRESS ADR IN TRANSFER-DESTINATION TOP ADDRESS REGISTER. |
| MOV TC0, TN | WRITING TRANSFER COUNT TN IN TRANSFER COUNT INITIAL REGISTER. |
| END INSTRUCTION | INSTRUCTION FOR STOPPING DMA PROCESSING UNIT. DMA PROCESSING UNIT STOPS TO OPERATE BY EXECUTION OF THIS INSTRUCTION. |

FIG. 5

```
    STDMA 7 ——————— 25
       MOV    SA0,x
       MOV    DA0,y
       MOV    TC0,Z
L1 ;   WAIT
       LDB    AU
       STB    AI
       LOOP   L1,L1
```
25: INSTRUCTION FOR WRITING n INSTRUCTIONS IN PROGRAM STORING AREA

FIG.7

SIMPLEST ONE: (ADDRESS IS INCREMENTED BY +1 FROM ADDRESS x IN UNITS OF ONE BYTE AT EVERY TRIGGER WHILE READING OUT Z TIMES)

MOV SA$\phi$, x     SA$\phi$ ← x
MOV TC$\phi$, Z     TC$\phi$ ← Z
−2: WAIT     STOPPING UNTIL TRIGGER OCCURS LDB AI     WHEN TC=0(THE BEGINNING), DR←M[SA$\phi$], SA←SA$\phi$+1
          WHEN TC≠0(NON-BEGINNING), DR←M[SA], SA←SA+1

LOOP −2, +1     WHEN TC=0, TC←TC$\phi$−1, IF TC≠0 GOTO−2   ELSE+1
             WHEN TC≠0, TC←TC−1,   IF TC≠0 GOTO−2   ELSE+1

+1: END     TERMINATION, STOP

FLOW CHART OF FIG.7 PROGRAM

MODIFICATION OF FIG.7 PROGRAM (ADDRESS IS CONTINUOUSLY INCREMENTED BY +1 FROM ADDRESS x IN RESPONSE TO ONE TRIGGER WHILE READING OUT Z TIMES)

```
        MOV    SA0,x
        MOV    TC0,Z
        WAIT
-1 :    LDB    A1
        LOOP   -1,+1
+1:     END
```

FLOW CHART OF FIG.9 PROGRAM

FIG.11

APPLIED EXAMPLE (OPERATION IN WHICH DATA READ OUT AT EVERY TRIGGER WHILE ADDRESS IS INCREMENTED BY +2 FROM ADDRESS $x_1$ IN UNITS OF ON WORD IS WRITTEN IN ADDRESS $y_1$ WHILE ADDRESS IS DECREMENTED BY −2 IS EFFECTED $z_1$ TIMES, AND THEN OPERATION IN WHICH DATA READ OUT FROM ADDRESS $x_1$ IN UNITS OF ONE WORD IN RESPONSE TO ONE TRIGGER IS WRITTEN IN ADDRESS $y_2$ WHILE ADDRESS IS INCREMENTED BY +2 IS EFFECTED $z_2$ TIMES, THEREAFTER RETURNING TO THE START)

```
       MOV  SA0,  x1
-11:   MOV  DA0,  y1
       MOV  TC0,  z1
-3: WAIT
       LDW  AI
       STW  AD
       LOOP -3,+1
+1:    MOV  DA0,  y2
       MOV  TC0,  z2
       WAIT
-2:    LDW  AU
       STW  AI
       LOOP -2, -11
```

FLOW CHART OF FIG.11 PROGRAM

DATA TRANSFER PROCESSING SYSTEM

This is a continuation of application Ser. No. 08/274,117, filed Jul. 12, 1994, now abandoned.

BACKGROUND OF THE INVENTION

1. Field of the Invention

The present invention relates to a data processing system equipped with a DMA processing unit to transfer data from an external data communication unit to a memory unit.

2. Description of the Prior Art

FIG. 14 is a block diagram showing an arrangement of a data processing unit equipped with a conventional direct memory access processing unit (which will be referred hereinafter to as a DMA processing unit). In FIG. 14, numeral 1 represents a CPU, and 2, 3 designate respectively the components of the CPU 1. The component 2 is a bus interface means (BIU) for performing the fetch of an instruction word and the input/output of data with respect to the CPU 1, and the component 3 is an instruction register (IR) for storing an instruction word to be effected. Further, numeral 4 represents a DMA processing unit, and 5, 6, 7, 8, 9, 10 respectively designate the components of the DMA processing unit 4. The component 5 is a control register (CR) for determining an operation of the DMA processing unit 4; the component 6 is a transferring-source address register (SA) showing an address of the transferring source of data to be transferred by the DMA processing unit 4; the component 7 is a transferring-destination address register (DA) showing an address of a transferring destination of data to be transferred by the DMA processing unit 4; the component 8 is a transfer count register (TC) showing the number of times of the transfer to be effected by the DMA processing unit 4; the component 9 is a control unit of the DMA processing unit 4; and the component 10 is a data register (DR) for temporarily storing the data read out from the transferring source. Moreover, numerals 11, 12, 13 denote an address bus, a data bus and a control signal bus, respectively, and numeral 14 depicts an external data communication unit and 15 indicates a memory unit. The external data communication means 14 and the memory unit 15 are coupled through the address bus 11, the data bus 12 and the control signal bus 13 to the CPU 1 and the DMA processing unit 4.

FIG. 15 shows the contents of the control register 5 of the DMA processing unit 4. In FIG. 15, numeral 16 is a bit indicative of the transfer unit in the DMA transfer where "0" indicates that the transfer unit is byte and "1" indicates that the transfer unit is word. Further, numeral 17 is a bit indicative of the mode of the DMA transfer where "0" indicates the cycle steal mode and "1" indicates the burst mode. Here, the cycle steal mode is an operational mode for DMA transfers to one unit of transfer in response to a DMA transfer request before returning to the CPU 1, and the burst mode is an operational mode for continuous transfers invoked by a DMA transfer request without returning to the CPU 1. Moreover, 18a and 18b are indicative of methods of correcting the address of the transfer source after the DMA transfer is effected in one transfer unit where, when "00", the address of the transfer source is fixed as it is after the DMA transfer, when "01", the address of the transfer source is incremented, when "10", the address of the transfer source is decremented, and "11" is in an unused state. Further, 19a and 19b show the correcting methods of the address of the transfer destination. When "00", the address of the transfer destination is fixed as it is after the DMA transfer, when "01", the address of the transfer destination is incremented, when "10", the address of the transfer destination is decremented, and "11" is in an unused state. Numeral 20 represents a DMA transfer effective flag where "0" indicates that the DMA processing unit is not used and "1" indicates that it is used.

The above-described system is for receiving data from an external device through the external data communication unit 14 and for processing the data in accordance with a procedure stored in the memory unit 15. In this case, when the data communication speed is slower as compared with the processing speed of the CPU 1, this processing procedure is realized by an interruption process. That is, in response to the reception of the data from the external, the external data communication unit 14 requests the CPU 1 to perform an interruption process. In response to this request, the CPU 1 interrupts the currently executing process and saves the program status word and the program counter in a stack and then branches to a program for the above-mentioned processing procedure. In this program there are written instructions for saving general-use registers of the CPU 1, reading the received data from the external data communication unit 14, writing the read data in the memory unit 15, for example. The above-mentioned processing procedure can be effected with this program being executed by the CPU 1.

However, when the communication speed is high, there is the possibility that the next data is supplied before reading the received data from the external data communication means 14, and hence the processing procedure due to the interruption can provide an inconvenience. In this case, a processing procedure using the DMA processing unit 4 is required to be effected. Thus, the interruption request signal of the external data communication unit 14 is arranged to become a DMA transfer request signal with respect to the DMA processing unit 4. Further, since the initialization of the respective registers is required before use, before performing the above-mentioned procedure, the DMA processing unit 4 writes, through the CPU, the control code "10010000" in the control register 5, the read address of the received data of the external data communication means 14 in the transfer-source address register 6, an adequate address of the memory means 15 in the transfer-destination address register 7, and the number of bytes of the coming data in the transfer count register 8.

In response to the reception of the data, the external data communication unit 14 generates an interruption request signal. This signal is inputted as the DMA transfer request signal to the DMA processing unit 4. In response to the input, the DMA processing unit 4 supplies a hold request signal to the CPU 1 which in turn interrupts the currently executing process and opens the address bus 11, the data bus 12 and the control signal bus 13 and further supplies a hold acknowledge signal to the DMA processing signal 4. Thus, the DMA processing unit 4 supplies a DMA acknowledge signal to the external data communication unit 14 so that the received signal is read out from the external data communication unit 14 in accordance with the address stored in the transfer-source address register 6 and temporarily stored in the data register 10. Secondly, this data is written in the memory unit 15 in accordance with the address stored in the transfer-destination address register 7. At the same time, the content of the transfer-destination address register 7 is incremented and the content of the transfer count register 8 is decremented. In response to the completion of the DMA transfer in one unit, the DMA processing unit 4 withdraws the hold request signal, and hence the CPU restarts the interrupted process.

Since a data processing system equipped with the conventional DMA processing unit is thus arranged, the data transfer can be effected even if the processing procedure due to the interruption of the CPU is inconvenient. There is a problem which arises with the system, however, in that the processing content of the DMA processing unit is determined and limited by the control register and hence difficulty is encountered, for example, to meet the requirement that a portion of the process is changed in accordance with the purpose.

SUMMARY OF THE INVENTION

The present invention has been developed in order to remove the above-mentioned problem, and it is an object to provide a data processing system equipped with a DMA processing unit which is capable of changing a portion of the process in accordance with the transfer purpose.

According to a first embodiment of this invention, as shown in FIG. 1, in a data processing system including a DMA processing unit to transfer data in accordance with a transfer processing procedure comprising a plurality of functions, the DMA processing unit is equipped with a program storing means for storing a transfer processing procedure comprising instruction words corresponding to the respective functions and an executing unit for executing the instruction words stored in the program storing unit, wherein the instruction word of the transfer processing procedure is inputted from the outside of the DMA processing unit.

According to a second embodiment of this invention, as illustrated in FIG. 13, in a data processing system including a central processing unit and a DMA processing unit for transferring data in accordance with a transfer processing procedure comprising a plurality of functions, the DMA processing unit is equipped with a program storing means for storing a transfer processing procedure comprising instruction words corresponding to the respective functions and a transmitting unit for transmitting the instruction word, stored in the program storing unit, to the central processing unit, and the central processing unit is equipped with an executing unit for executing the instruction word transmitted from the transmitting unit, wherein the instruction word of the transfer processing procedure is inputted from the outside of the DMA processing unit.

In the data processing system according to the first embodiment of this invention, the DMA processing unit 40 reads out the inputted instruction word from a program storing area to execute the instruction word for the transfer processing.

In the data processing system according to the second embodiment of this invention, the DMA processing unit reads out the inputted instruction word from a program storing area to supply it to the central processing unit (CPU) which in turn executes the instruction word for the transfer processing.

The above and other objects, features, and advantages of the Invention will become more apparent from the following description when taken in conjunction with the accompanying drawings.

BRIEF DESCRIPTION OF THE DRAWINGS

FIG. 2 shows a table of instruction words provided for use of the FIG. 1 DMA processing unit;

FIG. 3 illustrates a table of instruction words provided for use of the FIG. 1 DMA processing unit;

FIG. 4 is a continuation table of the FIG. 3 table;

FIG. 5 is an illustration of a program for use of the FIG. 1 DMA processing unit;

FIG. 7 is an illustration of one example of a program to be inputted from an external;

FIG. 11 is an illustration of one example of a program to be inputted from an external;

DESCRIPTION OF THE PREFERRED EMBODIMENT

Figure 1:
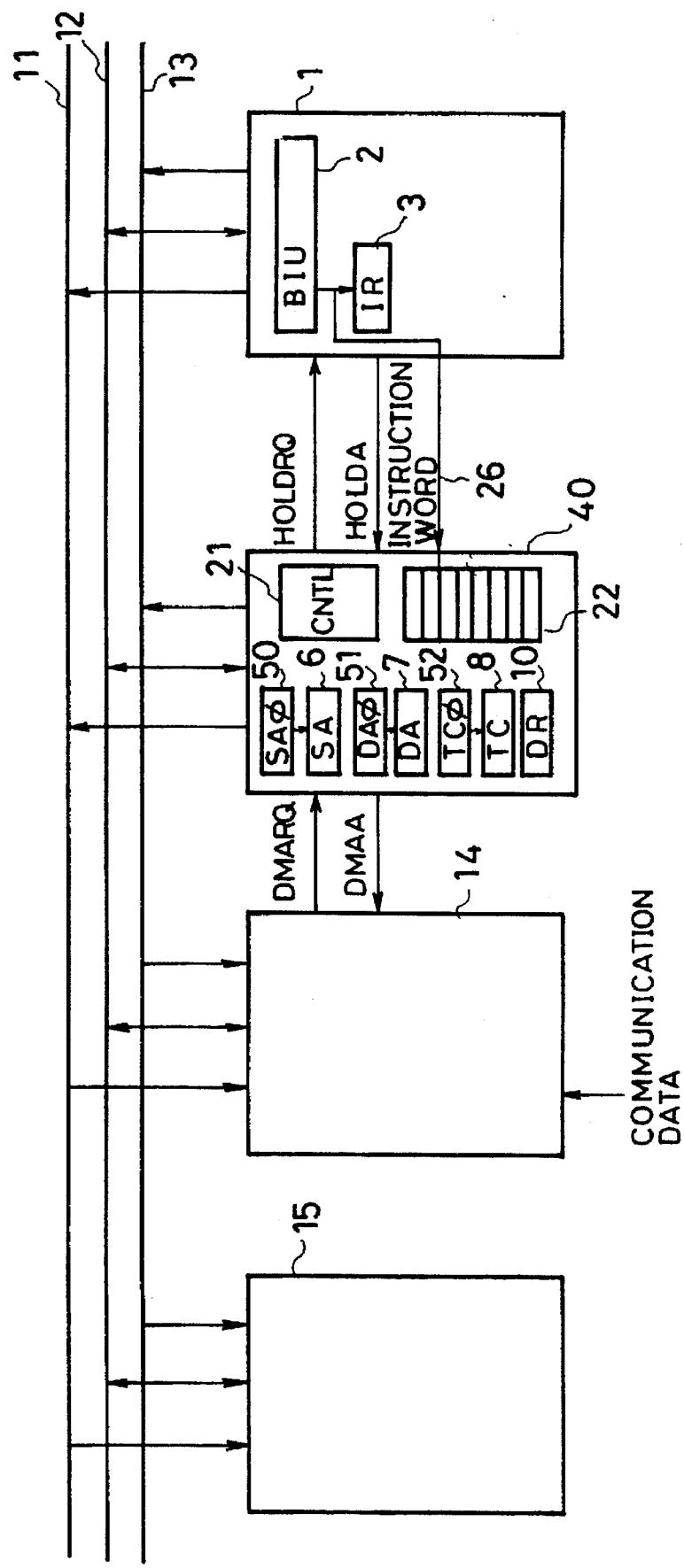
FIG. 1 is a block diagram showing an arrangement of a data processing system having a DMA processing unit according to a first embodiment of the present invention.

An embodiment of this invention will be described hereinbelow with reference to the drawings. FIG. 1 is a block diagram showing an arrangement of a data processing system equipped with a DMA processing unit according to the embodiment (first embodiment) of this invention. In FIG. 1, numeral 1 represents a CPU and 2, 3 designate the components of the CPU 1, the component 2 being a bus interface unit (BIU) for the fetch of an instruction word and the input/output of data with respect to the CPU 1 and the component 3 being an instruction register (IR) for holding an instruction word to be effected. Further, numeral 40 denotes a DMA processing unit and numerals 6, 7, 8, 10, 21, 22, 50, 51 and 52 respectively depict the components of the DMA processing unit 40. The component 6 is a transfer-source address register (SA) indicating an address of a transfer source of data to be transferred by the DMA processing unit 40, the component 7 is a transfer-destination address register (DA) indicating an address of a transfer destination of data to be transferred by the DMA processing unit 40, the component 8 is a transfer count register (TC) indicating the number of times of transfer to be effected by the DMA processing unit 40, the component 10 is a data register (DR) for temporarily storing data read out from the transfer source, the component 21 is a control means of the DMA processing unit 40, and the component 22 is a program storing area which acts as a storage unit to store a program for the processing procedure to be executed by the DMA processing unit 40. Moreover, the component 50 is a transfer-source top address register indicating the top (leading) address of the transfer source, the component 51 is a transfer-destination top address register indicating the top address of the transfer destination, and the component 52 is a transfer count initial register for initial-setting the transfer count. Moreover, numerals 11, 12 and 13 represent an address bus, a data bus and a control signal bus, respectively. Numeral 14 designates an external data communication unit and 15 depicts a memory unit. These external data communication unit 14 and the memory unit 15 are respectively coupled through the address bus 11, the data bus 12 and the control signal bus 13 to the CPU 1 and the DMA processing unit 40. In addition, numeral 26 is an instruction word transfer bus to be used when the CPU 1 writes the program of the processing procedure in the program storing area 22.

FIGS. 2, 3 and 4 are tables of instruction words provided in order to use the DMA processing unit 40 according to this first embodiment. In FIG. 2, numeral 25 designates an instruction for writing the subsequent n instructions in the program storing area 22. In accordance with the instruction inputted from an external by means of the CPU, one of the functions shown in FIGS. 2 to 4 is selected so as to execute the transfer operation in accordance with the selected function.

In the data processing system equipped with the DMA processing unit according to the first embodiment of this invention, in the case of performing a process similar to that of the conventional technique, before the DMA transfer, the CPU 1 performs the program illustrated in FIG. 5 and inputted from an external. When finding out the instruction word "STDMA 7" 25, the CPU 1 decides that the instruction words are seven in number and writes the seven instruction words after this instruction in the program storing area 22 through an instruction word transfer bus 26. Thus, except for the initial instruction word "STDMA 7" 25, the program is stored in the program storing area 22 of the DMA processing unit 40. The execution of the program is effected under control of the control unit 21.

After the execution of "MOV SAΦ, x", "MOV DAΦ, y" and "MOV TCQ, Z", the DMA processing unit 40 repeatedly executes the instruction word "WAIT" until inputting a DMA transfer request signal to allow the start of the DMA transfer. In response to the reception of data, the external data communication unit 14 generates an interruption request signal. This signal is inputted as the DMA transfer request signal to the DMA processing unit 40, whereby the DMA processing unit 40 supplies a hold request signal to the CPU 1 which in turn interrupts the currently executing process and opens the address bus 11, the data bus 12 and the control signal bus 13 and further supplies a hold acknowledge signal to the DMA processing unit 40. In response to the hold acknowledge signal, the DMA processing unit 40 supplies a DMA acknowledge signal to the external data communication means 14 and further executes the next instruction word "LDB AU". In detail, the DMA processing unit 40 executes the function corresponding to this instruction word in the FIG. 2 table. Thus, the received data is read out from the address designated by the transfer-source address register 6 of the external data communication means 14. Secondly, the function in FIG. 2 which corresponds to the instruction word "STB AI" is executed whereby the data read out by the function corresponding to the instruction word "LDB AU" is written at the address designated by the transfer-destination address register 7 of the memory unit 15. At the same time, the content of the transfer-destination address register 7 is incremented. The content of the transfer count register 8 is decremented by the function corresponding to the final instruction word "LOOP L1, L1", before branching to the label L1, i.e., the initial instruction word "WAIT" stored in the program storing area 22. After the completion of the above-described DMA transfer in one unit, the DMA processing unit 40 withdraws the hold request signal whereby the CPU restarts the interrupted process.

Although in the above-described DMA transfer each of the length of the data read out by the instruction word "LDB AU" and the length of the data written by the instruction word "STB AI" is 1 byte, if the instruction word "STW AI" is used in place of the instruction word "STB AI", the change of the data length can automatically be made. Thus, for changing the data length, it is not required to perform a data process through a software.

Figure 6:
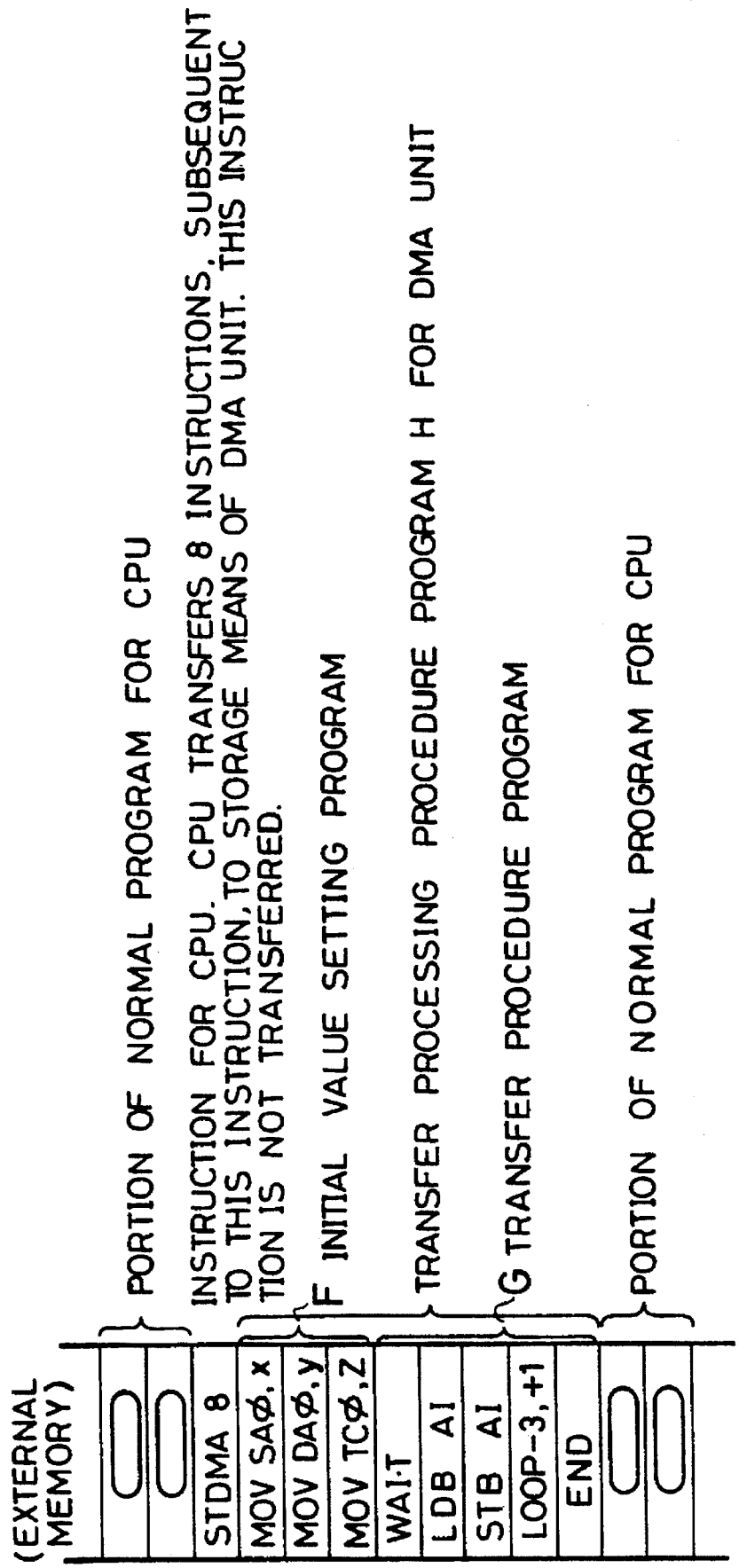
FIG. 6 is an illustration of one example of the arrangement pattern of an instruction word to be inputted from an external.
Figure 8:
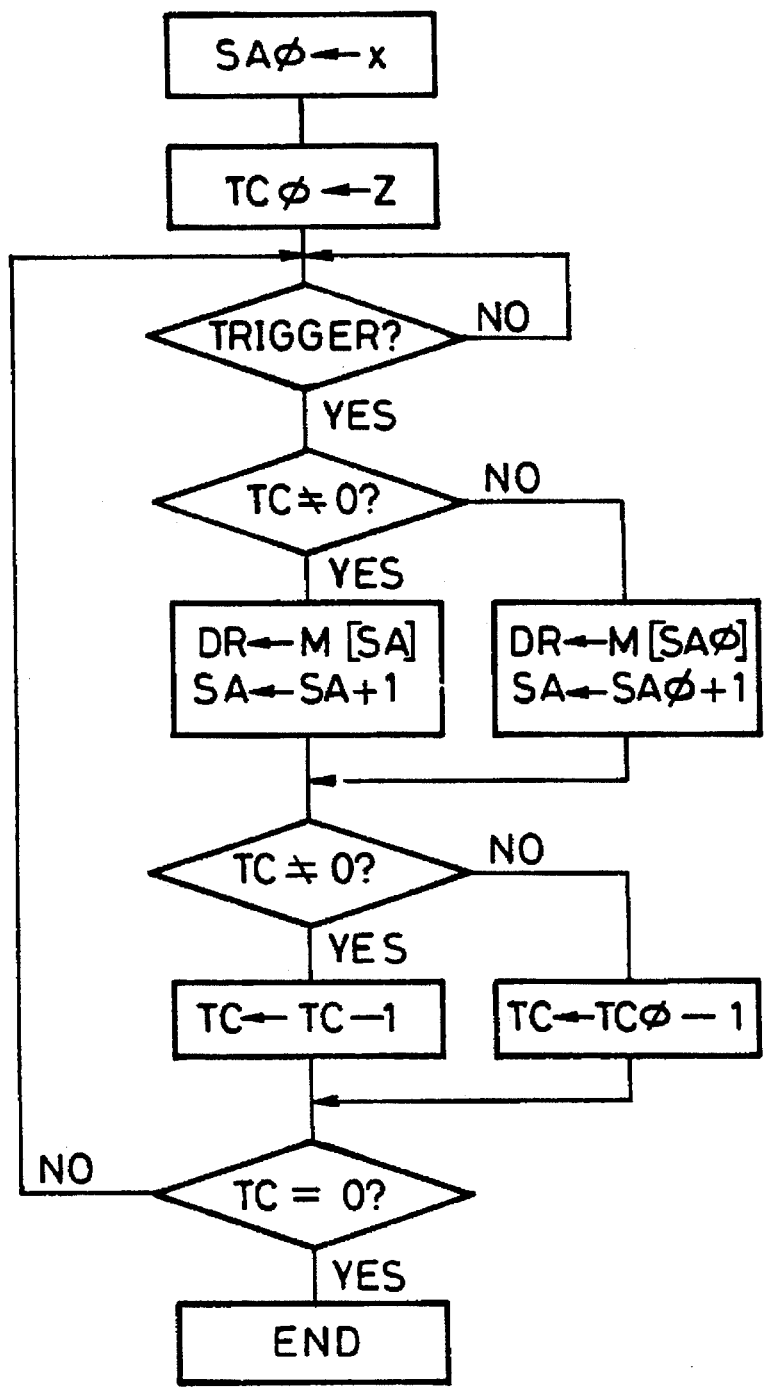
FIG 8 is a flow chart of the FIG. 6 program to be inputted from an external.
Figures 9, 10:
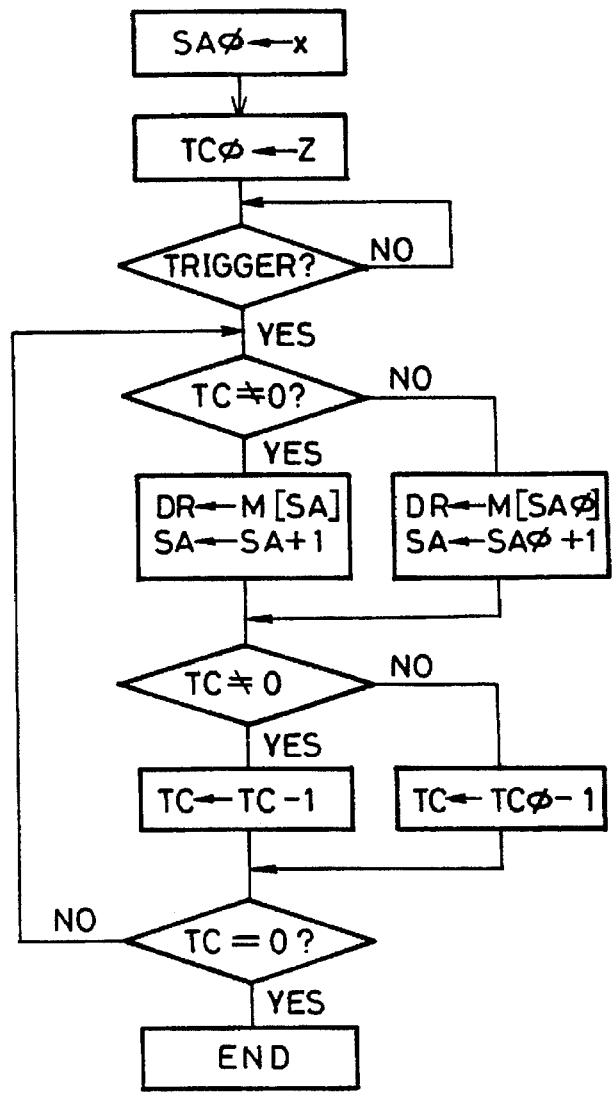
FIG. 9 shows one example of a program to be inputted from an external.
FIG. 10 is a flow chart of the FIG. 8 program to be inputted from an external.
Figure 12:
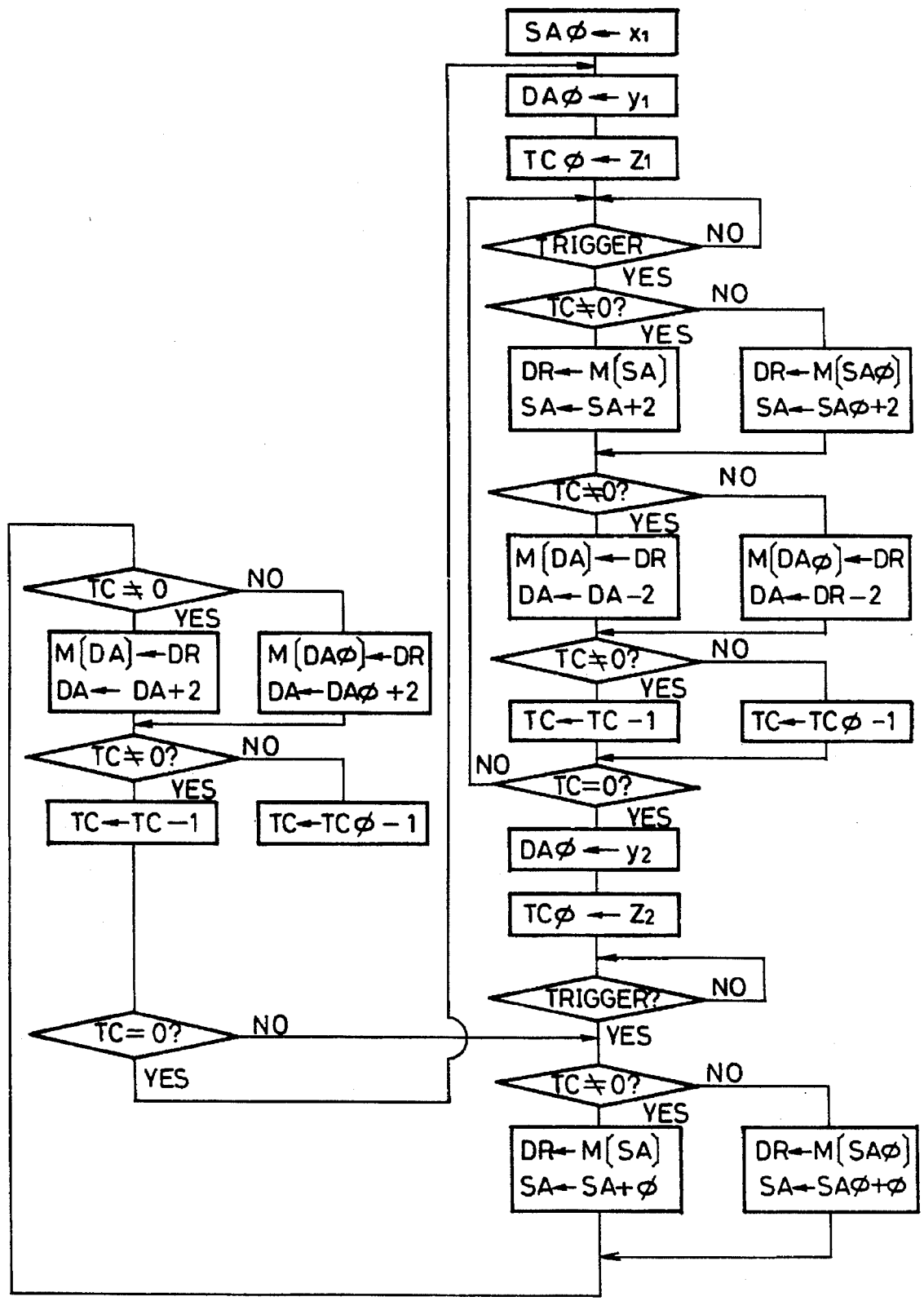
FIG. 12 is a flow chart of the FIG. 10 program to be inputted from an external.

A further detailed description will be made hereinbelow. The program (whose contents are shown at every address in FIG. 6) for the DMA processing unit 40 which has been supplied from external memories (ROM, RAM) is transferred from the CPU 1 to be stored in the program storing area 22. In response to the completion of such a program transfer from the CPU 1, the DMA processing unit 40 performs a transfer process by an initial value setting program F included in this program and a function corresponding to the instruction word written in a transfer procedure program G in accordance with the tables shown in FIGS. 2 to 4 under control of the control unit 21. Accordingly, with the instruction word from the CPU 1 being merely stored in the DMA processing unit 40, the transfer process can be effected by the function stored at every instruction word in advance. Here, examples of the program and flow charts for the DMA processing unit 40 are shown in FIGS. 7 to 12. According to this first embodiment, it is possible to perform various kinds of transfer procedures only by changing the program from an external.

Although in the above-described first embodiment the execution of the program stored in the program storing area 22 is made under control of the control unit 21 of the DMA processing unit 40, it is also possible that the execution of the program is made by the CPU 1.

Figure 13:
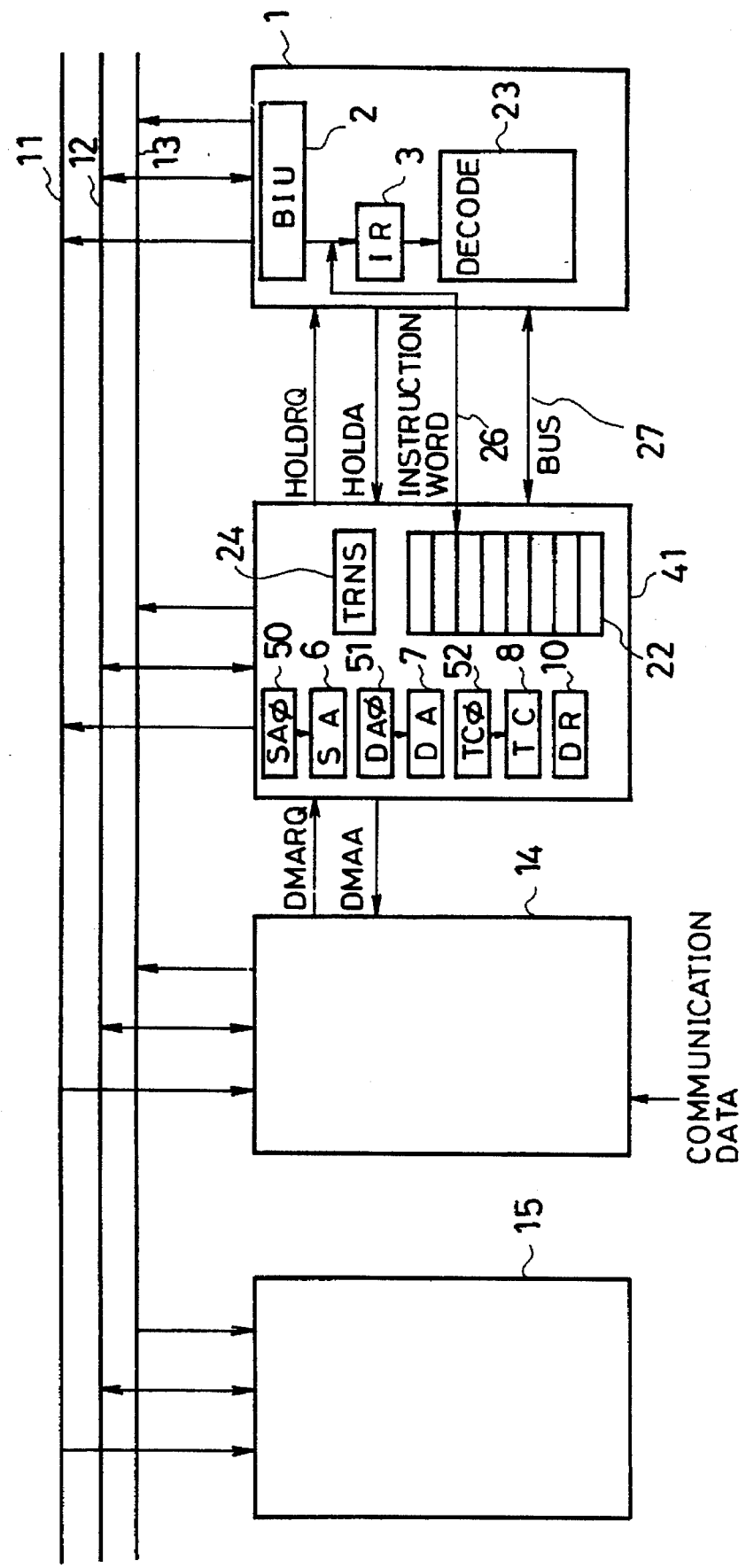
FIG. 13 is a block diagram showing an arrangement of a data processing system including a DMA processing unit according to a second embodiment of this invention.
Figure 14:
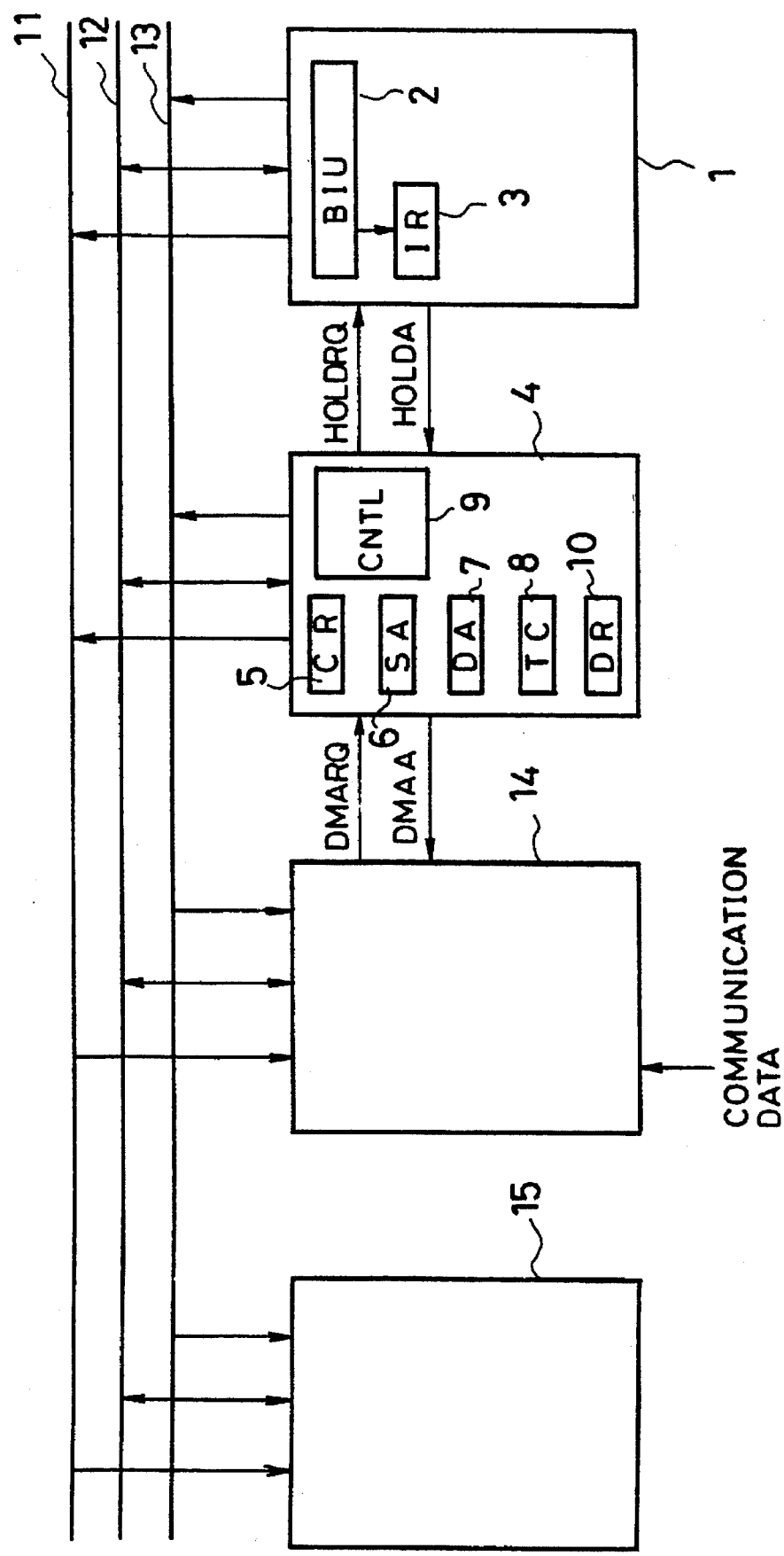
FIG. 14 is a block diagram showing an arrangement of a data processing system including a conventional DMA processing unit.
Figure 15:
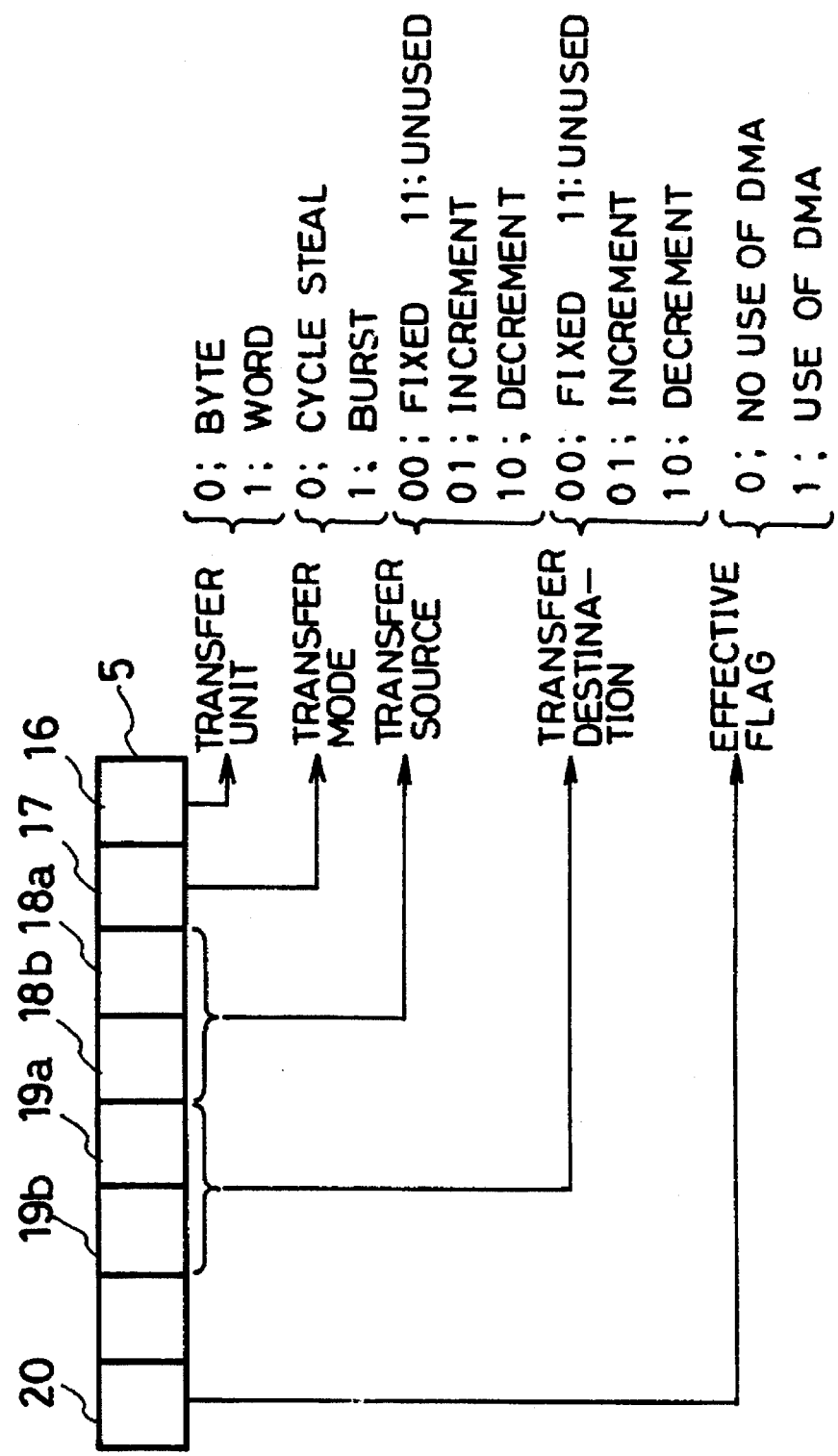
FIG. 15 is an illustration of the contents of a control register of the conventional DMA processing unit.

An embodiment (second embodiment) of this invention will be described hereinbelow. In FIG. 13, numeral 23 is an instruction interpreting unit for interpreting the instruction word, held in the instruction register 3, to control the execution of the instruction. The CPU 1 comprises the instruction register 23, the bus interface unit 2 and the instruction register 3. Further, numeral 24 is an instruction word transmitting means for transmitting the instruction word, stored in the program storing area, to the CPU 1, and 27 is an internal bus to be used by the CPU 1 when executing the processing procedure program. Moreover, numeral 41 represents a DMA processing unit comprising a transfer-source top address register 50, a transfer-source address register 6, a transfer-destination address register 7, a transfer count initial register 52, a transfer count register 8, a data register 10, an instruction word transmitting unit 24 and a program storing area 22. Here, in the second embodiment, except for the portions 23, 24 and 27, the other portions are the same in function as those in the first embodiment and are marked with the same reference, and hence the description thereof will be omitted.

The CPU 1 can execute the functions of the instruction words, shown in FIGS. 2 and 3, by use of the transfer-source address register 6, transfer-destination address register 7, transfer count register 8, data register 10 and others of the DMA processing unit 41. Further, the data register 10 can be treated in the same manner as a general-use register within the CPU. As well as the first embodiment, first, the program shown in FIG. 4 is executed by the CPU 1, whereby the instruction words "MOV SAΦ, 2", "MOV DAΦ, y" and "MOV TCΦ, Z" are executed for the initial setting and then the DMA processing program after the instruction word "STDMA n" is stored in the program storing area 22.

In response to the reception of data, the external data communication unit 14 generates an interruption request signal. This signal is inputted as the DMA transfer request signal to the DMA processing unit 41. The DMA processing unit 41 supplies a hold request signal to the CPU 1. The CPU 1 interrupts the currently executing process and opens the address bus 11, the data bus 12 and the control signal bus 13 and further supplies a hold acknowledge signal to the DMA processing unit 41. In response to the acknowledge signal, the DMA processing signal 41 supplies a DMA acknowledge signal to the external data communication means 14 and further transmits the instruction word "LDB AU" through the instruction word transmitting executing unit 24 to the CPU 1. This instruction word is stored in the instruction register 3 and interpreted by the instruction word interpreting unit 23 on the basis of the tables shown in FIGS. 2 to 4, whereby the received data is read out from the external data communication means 14. Secondly, the instruction word "STB Ai" is transmitted whereby the data read out by the instruction word "LDB AU" is written in the memory unit 15 and at the same time the content of the transfer-destination address register 7 is incremented. The content of the transfer count register 8 is decremented by the final instruction word "LOOP L1, L1", before branching to the label "L1", i.e., the initial instruction word "WAIT". When finding out the instruction word "WAIT", the CPU 1 interrupts the DMA transfer process, thereby completing the DMA transfer in one unit.

In this embodiment, it is also possible that a data processing 25 procedure is inserted between the instruction word "LDB AU" and the instruction word "STB AI". For example, with an instruction word "NOT DR" being placed thereat, it is possible to invert the data during the DMA transfer. In addition, it is also appropriate that the CPU 1 calculates the data, read out from the external data communication unit 14, and then writes it in the memory unit 15. This can eliminate the need of the calculation to be effected later.

As described above, according to the first and second embodiments, the function corresponding to the instruction inputted from an external is derived from a table, set in advance, so as to perform the transfer process in accordance with this function so that the DMA transfer procedure can be described with a program. Thus, it is possible to change a portion of the process in accordance with the purpose only by changing this program.

What is claimed is:

1. A data transfer processing system comprising a central processing unit (CPU), a direct memory access (DMA) processing unit, and external data communication means for issuing an interrupt processing request signal to the DMA processing unit or the CPU when it receives data from the outside, the DMA processing unit or the CPU transferring the data to a transfer destination upon receipt of the interrupt processing request signal, wherein the data transfer processing system further comprises:

memory means external to the CPU and the DMA processing unit, wherein the memory means is coupled to the CPU, wherein a plurality of programs for changing contents of data transfer processing constituted by a plurality of instruction words which are provided for changing contents of data transfer processing executed by the DMA processing unit are stored within the memory means; and wherein a specific instruction word for transferring a plurality of instruction words lumped together which constitute a single program for changing contents of data transfer processing is stored with the memory means wherein the DMA processing unit comprises:

program storage means for storing the programs for changing the contents of data transfer processing, each including a plurality of instruction words, executing means for executing the contents of each instruction word of the programs for changing the contents of data transfer processing stored in the program storage means, and a plurality of register means controlled by the executing means, wherein the DMA processing unit transfers data received by the external data communication means to the memory means through control of the plurality of register means by the executing means in accordance with the programs for changing the content of the data transfer processing;

wherein the program storage means in said DMA processing unit is coupled to the CPU by an instruction word transfer bus;

and wherein the CPU comprises:

means for executing the specific instruction stored in said memory means to access the plurality of instruction words lumped together which constitute a single program and for transferring the plurality of instruction words accessed to the program storage means of the DMA processing unit via the instruction word transfer bus as the program for changing the content of data transfer processing.

2. The data transfer processing system according to claim 1, wherein the plurality of register means in the DMA processing unit include a transfer-source leading address register, transfer-source address register, transfer-destination leading address register, transfer-destination address register, transfer count register, transfer count initial register and data register; the programs for changing the contents of the data transfer processing stored in the program storage means of the DMA processing unit include an initial value setting program and a transfer procedure program; and the DMA processing unit transfers the data received by the external data communication means to the memory means through control of the registers by the executing means in accordance with the transfer procedure program after initial values are set in the transfer-source leading address register, transfer-destination leading address register and transfer count initial register in accordance with the initial value setting program.

3. A data transfer processing system comprising a central processing unit (CPU), a direct memory access (DMA) processing unit, and external data communication means for issuing an interrupt processing request signal to the DMA processing unit or the CPU when it receives data from the outside, the DMA processing unit or the CPU transferring the data to a transfer destination upon receipt of the interrupt processing request signal, wherein the data processing system further comprises:

memory means external to the CPU and the DMA processing unit, wherein the memory means is coupled to the CPU, wherein a plurality of programs for changing contents of data transfer processing constituted by a plurality of instruction words which are provided for changing contents of data transfer processing executed by the DMA processing unit are stored within the memory means; and wherein a specific instruction word for transferring a plurality of instruction words lumped together which constitute a single program for changing contents of data transfer processing is stored with the memory means:

wherein the DMA processing unit comprises:

program storage means for storing the programs for changing the contents of data transfer processing, transfer means for transferring each instruction word of a program for changing the contents of data transfer processing stored in the Program storage means to the CPU, and a plurality of register means controlled by the CPU;

wherein the program storage means in said DMA a processing unit is coupled to the CPU by an instruction word transfer bus; and wherein the CPU comprises:

means for transferring the programs for changing the data transfer processing, via the instruction word transfer bus, from the memory means to the program storage means of the DMA processing unit, means for executing each instruction word of a program for changing the data transfer Processing transferred by the transfer means of the DMA processing unit to the CPU, and means for controlling the plurality of register means in the DMA processing unit to transfer data received by the external data communication means to the memory means.

4. A data transfer processing system comprising a central processing unit (CPU), a direct memory access (DMA) processing unit, and external data communication means for issuing an interrupt processing request signal to the DMA processing unit or the CPU when it receives data from the outside, the DMA processing unit or the CPU transferring the data to a transfer destination upon receipt of the interrupt processing request signal, wherein the data transfer processing system further comprises:

memory means external to the CPU and the DMA processing unit, wherein the memory means is coupled to the CPU and, wherein a plurality of programs for changing contents of data transfer processing constituted by a plurality of instruction words which are provided for changing contents of data transfer processing executed by the DMA processing unit are stored within the memory means; and wherein a specific instruction word for transferring a plurality of instruction words lumped together which constitute a single program for changing contents of data transfer processing is stored with the memory means;

wherein the DMA processing unit comprises:

program storage means for storing the programs for changing the contents of data transfer processing, each including a plurality of instruction words, transfer means for transferring each instruction word of the programs for changing the contents of data transfer processing stored in the program storage means to the CPU, and a plurality of register means controlled by the CPU;

wherein the program storage means in said DMA a processing unit is coupled to the CPU by an instruction word transfer bus; and wherein the CPU comprises:

means for accessing the plurality of instruction words lumped to together which constitute a single program specified by the specific instruction word and for transferring, via the instruction word transfer bus, the plurality instruction words which constitute a single program from the memory means to the program storage means of the DMA processing unit as the data transfer processing procedure program when the specific instruction word stored is accessed from the memory means, means for executing each instruction word of the program for changing the contents of data transfer processing transferred from the DMA processing unit to the CPU by the transfer means of the DMA processing unit, and means for transferring the data received by the external data communication means to the memory means by controlling the plurality of register means in the DMA processing unit.

5. The data processing system according to claim 3 or 4, wherein the plurality of register means in the direct memory access (DMA) processing unit include a transfer-source leading address register, transfer-source address register, transfer-destination leading address register, transfer-destination address register, transfer count register, transfer count initial register and data register; the programs for changing the contents of the data transfer processing stored in the program storage means of the DMA processing unit include an initial value setting program and a transfer procedure program; and the CPU transfers the data received by the external data communication means to the memory means by controlling the registers in accordance with the transfer procedure program transferred by the transfer means of the DMA Processing unit after initial values are set in the transfersource leading address register, transfer-destination leading address register, and transfer count initial register in accordance with the initial value setting program transferred by the transfer means of the DMA Processing unit.

6. The data transfer processing system according to, claim 1, 3 or 4, wherein the data transfer processing procedure programs stored in the program storage means of the DMA processing unit further include a processing for inverting data transferred to the data register and a data conversion program for performing arithmetic operations on the data transferred to the data register.

7. A method for controlling data transfer operations in a data transfer processing system, wherein the data transfer processing system comprises a central processing unit (CPU), a direct memory access (DMA) processing unit, and external data communication means for issuing an interrupt processing request signal to the DMA processing unit or the CPU when it receives data from the outside, the DMA processing unit or the CPU transferring the data to a transfer destination upon receipt of the interrupt processing request signal, wherein the data transfer processing system further comprises memory means accessible by the CPU, wherein the DMA processing unit comprises DMA program storage means coupled to executing means and to a plurality of register means controlled by the executing means, with the DMA program storage means coupled to the CPU by an instruction word transfer bus, the method comprising the following steps:

storing, in the memory means, a plurality of programs for changing contents of data transfer processing constituted by a plurality of instruction words which are provided for changing contents of data transfer processing executed by the DMA processing unit are stored within the memory means and a specific instruction word for transferring a plurality of instruction words lumped together which constitute a single program for changing contents of data transfer processing is stored with the memory means;

using the CPU to access the plurality instruction words lumped together which constitute a single program specified by the specific instruction word from the memory means and to transfer, via the instruction word transfer bus, the plurality of instruction words accessed to the program storage means of the DMA processing unit as the program for changing the contents of the data transfer processing when the specific instruction word stored in the memory means is accessed and executed; and executing the contents of each instruction word of the program for changing the contents of the data transfer processing stored in the program storage means;

using the DMA processing unit to transfer data received by the external data communication means to the memory means through control of the plurality of register means by the executing means in accordance with the programs for changing the contents of the data transfer processing.

8. A method for controlling data transfer operations in a data transfer processing system, wherein the data transfer processing system comprises a central processing unit (CPU), a direct memory access (DMA) processing unit, and external data communication means for issuing an interrupt processing request signal to the DMA processing unit or the CPU when it receives data from the outside, the DMA processing unit or the CPU transferring the data of a transfer destination upon receipt of the interrupt processing request signal, wherein the data transfer processing system further comprises memory means accessible by the CPU, wherein the CPU comprises executing means for executing instructions, and wherein the DMA processing unit comprises DMA program storage means, with an instruction word transfer bus coupling the DMA program storage means to the CPU, instruction transfer means for transferring an instruction from said program storage means to said CPU for execution, and a plurality of register means controlled by the executing means in said CPU, the method comprising the following steps:

storing, in the memory means, a plurality of programs for changing contents of data transfer processing constituted by a plurality of instruction words which are provided for changing contents of data transfer processing executed by the DMA processing unit are stored within the memory means and a specific instruction word for transferring a plurality of instruction words lumped together which constitute a single program for changing contents of data transfer processing is stored with the memory means;

using the CPU to access the plurality instruction words lumped together which constitute a single program specified by the specific instruction word from the memory means and to transfer, via the instruction word transfer bus, the plurality of instruction words accessed to the program storage means of the DMA processing unit as the program for changing the contents of the data transfer processing when the specific instruction word stored in the memory means is accessed and executed; and executing the contents of each instruction word of the program for changing the contents of the data transfer processing stored in the program storage means in the executing means of said CPU;

using the DMA processing unit to transfer data received by the external data communication means to the memory means through control of the plurality of register means by the executing means in accordance with the data transfer processing procedure programs.

9. The system of claim 2 wherein the programs for changing contents of data transfer processing include a Wait command as a first instruction word following the initial value setting program for keeping the DMA processing unit to wait for the transfer processing until the DMA processing unit receives a DMA transfer request signal as an interrupt processing request signal.

10. The system of claim 2 wherein the programs for changing the contents of data transfer processing include a loop instruction which specifies loops for processing.

11. The system of claim 2 wherein the programs for changing the contents of data transfer processing include a command for writing data into the data register in a byte unit or in a word unit and command for transferring data written in the data register to a destination address in a byte unit or in a word unit.

12. The system of claim 5 wherein the programs for changing contents of data transfer processing include a Wait command as a first instruction word following the initial value setting program for keeping the DMA processing unit to wait for the transfer processing until the DMA processing unit receives a DMA transfer request signal as an interrupt processing request signal.

13. The system of claim 5 wherein the programs for changing the contents of data transfer processing include a loop instruction which specifies loops for processing.

14. The system of claim 5 wherein the programs for changing the contents of data transfer processing include a command for writing data into the data register in a byte unit or in a word unit and command for transferring data written in the data register to a destination address in a byte unit or in a word unit.

* * * * *